US008524857B2

(12) United States Patent
Peera et al.

(10) Patent No.: US 8,524,857 B2
(45) Date of Patent: *Sep. 3, 2013

(54) DIAMINO-ALCOHOL COMPOUNDS, THEIR MANUFACTURE AND USE IN EPOXY RESINS

(75) Inventors: Asghar Akber Peera, Buffalo Grove, IL (US); Ian Tomlinson, Midland, MI (US)

(73) Assignees: Dow Global Technologies LLC, Midland, MI (US); ANGUS Chemical Company, Buffalo Grove, IL (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/928,600

(22) Filed: Dec. 15, 2010

(65) Prior Publication Data

US 2011/0152407 A1    Jun. 23, 2011

Related U.S. Application Data

(60) Provisional application No. 61/284,637, filed on Dec. 22, 2009.

(51) Int. Cl.
*C08G 59/64* (2006.01)
*C08L 63/00* (2006.01)

(52) U.S. Cl.
USPC .......... 528/421; 528/418; 528/419; 528/422; 523/404; 523/427; 523/428

(58) Field of Classification Search
USPC ............... 523/403, 404, 427, 428; 528/403, 528/405, 406, 407, 418, 419, 421, 422
See application file for complete search history.

(56) References Cited

U.S. PATENT DOCUMENTS

| | | | |
|---|---|---|---|
| 2,475,996 A | 7/1949 | Smith | |
| 3,607,833 A | 9/1971 | De Holf | |
| 4,293,682 A | 10/1981 | Kluger et al. | |
| 4,330,644 A | 5/1982 | Allen | |
| 4,340,717 A | 7/1982 | Kluger et al. | |
| 5,112,926 A | 5/1992 | Lee et al. | |
| 5,436,339 A * | 7/1995 | Baker et al. | 546/14 |
| 5,478,885 A | 12/1995 | Masse et al. | |
| 7,001,938 B2 | 2/2006 | Watkins et al. | |
| 8,070,044 B1 * | 12/2011 | Fleming et al. | 228/180.21 |
| 8,070,045 B1 * | 12/2011 | Fleming et al. | 228/180.21 |
| 2004/0147690 A1 | 7/2004 | Watkins et al. | |
| 2007/0065669 A1 | 3/2007 | Edmondson et al. | |

FOREIGN PATENT DOCUMENTS

WO   2009089145 A1   7/2009

* cited by examiner

*Primary Examiner* — Michael J Feely
(74) *Attorney, Agent, or Firm* — Marcella M. Bodner

(57) ABSTRACT

A new class of compounds, namely diamino alcohols, is described, along with a process for their production and their use as hardeners, or curing agents, for epoxy resin systems, some of which have high glass transition temperatures, Tgs, such as greater than about 120° C.

12 Claims, No Drawings

DIAMINO-ALCOHOL COMPOUNDS, THEIR MANUFACTURE AND USE IN EPOXY RESINS

This application claims the benefit of priority under 35 U.S.C. §119(e) of U.S. Provisional Patent Application No. 61/284,637 filed on Dec. 22, 2009.

FIELD OF THE INVENTION

The present invention relates to a new class of compounds, namely diamino-alcohols, a process for producing same, and their use in preparing epoxy resins having high glass transition temperatures (Tg).

BACKGROUND OF THE INVENTION

Simple amine compounds are known to provide neutralizing, dispersant and hardening properties when added to coatings, mineral slurries and epoxy formulations. Methods for simple amine compound manufacture are well-documented and known in the art, and when the goal is to prepare primary amines, the preferred routes often involve intermediate nitro alcohol compounds.

Processes for the manufacture of the intermediate nitro alcohol compounds, are known and typically nitro aldol reaction (Henry Reaction) between nitroalkanes and aldehydes. There has been occasional reference to the preparation of dinitroalcohols involving a tandem Michael addition and Henry reaction of a nitroalkane with an α,β-unsaturated aldehyde. For example, see "Secondary dinitro alcohols," Smith, Curtis W. (Shell Development Co.) 1949, and U.S. Pat. No. 2,475,996, which describe the manufacture of the nitro alcohol 2,5,6-trimethyl-2,6-dinitro-3-heptanol. This nitro alcohol is also prepared as an intermediate to making a vasopeptidase inhibitor, as discussed in Efficient Asymmetric Synthesis of the Vasopeptidase Inhibitor BMS-189921 by Janak Singh et al., Org. Lett. (2003), 5, 17, 3155-3158. In addition, manufacture of the nitro alcohol compound 2,6-dinitro-5-phenyl-heptan-3-ol has been described in David St. Clair Black et. al. Australian Journal of Chemistry, 1976, 29(11), 2511. As is also well-established, nitroalcohol compounds may be readily converted to the amino alcohol compounds by hydrogenation with hydrogen over a suitable catalyst, for example Raney nickel or a platinum- or palladium-based catalyst (Pt or Pd in elemental form or as oxides, with or without supports, e.g., carbon). Those skilled in the art are also aware that other reducing agents which will reduce nitroalkanes to primary amines include metal/acid combinations, e.g., iron/acetic acid; and aluminum hydrides. The preferred reducing agents include hydrogen gas in combination with any of the following catalysts: Raney nickel, platinum or palladium.

Diamino alcohol compounds and their uses, on the other hand, are not currently represented in the prior art.

Amines and amino alcohols are known to be hardeners, or curing agents, for epoxy resins. There are a number of amines that are currently used commercially as hardeners or curing agents that result in resins with high Tg, however, these are typically cycloaliphatic or aromatic diamines. Some of the examples of amines and the Tg of the resin produced when cured with D.E.R. 331 epoxy resin commercially available from Dow Chemical Company, Midland, Mich., include cyclohexane-1,2-diamine (Tg: 152° C.); isophorone diamine (IPDA) (147° C.) and 4-((4-aminocyclohexyl)methyl)cyclohexanamine (163° C.). Diamines that are straight chain aliphatic are useful as hardeners, but typically do not result in a resin with high Tg. Examples of aliphatic diamines are Dytek (Tg: 104° C.), AEP (Tg: 106° C.) and TMD (Tg: 104° C.).

Similarly, amino alcohols are used as hardeners or curing agents commercially today, due to their ability to cure at lower temperatures than simple amines, but these amines also do not enable the formation of cured epoxy resins with high glass transition temperatures (Tg). Some of the most common examples of amino alcohols include, without limitation, ethanolamine (EA), diethanolamine (DEA), 2-amino-2-methyl-1-propanol (AMP) which is commercially available from ANGUS Chemical of Buffalo Grove, Ill., USA), and 2-amino-2-ethyl-1,3-propanediol (AEPD) [Asghar checking whether we have Tg data for any of these amino-alcohols], also commercially available from ANGUS Chemical of Buffalo Grove, Ill., USA, etc. Well-known and heavily used amine hardener systems in the industry include, but are not limited to, isophoronediamine (IPDA), meta-xylenediamine (MXDA), aminoethylpiperazine (AEP), ethylenediamine, etc. Additionally, the use of TRIS-AMINO, which is a non-volatile alkanolamine possessing primary amine functionality commercially available from ANGUS Chemical of Buffalo Grove, Ill., USA, has been reported in the patent literature. U.S. Pat. Nos. 4,330,644, 3,607,833 and 7,001,938, as well as U.S. Patent Application Publication No. US2007/0065669, each describes the use of TRIS-AMINO in various epoxy-based compositions.

However, many of the amino alcohol-based hardeners currently used only provide cured epoxy resins with glass transition temperatures of less than about 120° C. and are, therefore, often unsuitable for high temperature applications. An amino alcohol based hardener that can result in a resin with a high glass transition temperature (i.e., greater than about 120° C.) useful for high temperature applications would be of value. The added advantage of amino alcohol versus simple aliphatic amines is the improved properties resulting from the presence of the alcohol functionality. There is literature precedent that the adhesion performance of an epoxy coating is due to the interaction of hydroxyl groups with the surface to which the coating is applied. Furthermore, It is also known, that hydroxyl group has catalytic effect in the curing profile, thus enabling cure at lower temperatures (see, for example, U.S. Pat. No. 3,943,104).

SUMMARY OF THE INVENTION

The present invention provides a cured resin system comprising: (a) 35 to 90% by weight of at least one epoxy resin; and (b). 0.1% to 35% of a diamino alcohol compound having the formula:

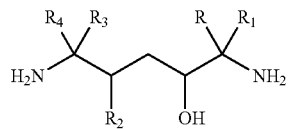

wherein R is independently hydrogen, alkyl, or aryl; $R_1$ is independently hydrogen, or alkyl; alternatively, R and $R_1$ may be linked together to form a cycloalkyl; $R_2$ is independently hydrogen, alkyl, or aryl; $R_3$ is independently hydrogen, alkyl, or aryl; $R_4$ is independently hydrogen, or alkyl; and alternatively, $R_3$ and $R_4$ may be linked together to form a cycloalkyl; wherein all weight percents are based on the total weight of the cured resin system. The epoxy resin may be one or more compounds selected from the group consisting of: cycloaliphatic (acyclic) epoxides, cycloaliphatic epoxides modified with glycols, epoxy phenolic novolac resins, multifunctional (polyepoxy) epoxy resins, bisphenol A-based epoxy resins, and bisphenol F-based epoxy resins.

In one embodiment of the cured resin system of the present invention, the epoxy resin comprises a mixture of at least two epoxy resins.

In a particular embodiment, the diamino alcohol compound may be the product of 2-nitropropane and one aldehyde selected from the group consisting of crotonaldehyde and cinnamaldehyde. For example, R, $R_1$, $R_2$, $R_3$ and $R_4$ are each methyl.

The present invention also provides a method for preparing a curable resin system comprising admixing: (a) 35 to 65% by weight of at least one epoxy resin; and (b) 0.1 to 35% by weight of a diamino alcohol compound having the formula:

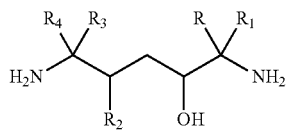

wherein R is independently hydrogen, alkyl, or aryl; $R_1$ is independently hydrogen, or alkyl; alternatively, R and $R_1$ may be linked together to form a cycloalkyl; $R_2$ is independently hydrogen, alkyl, or aryl; $R_3$ is independently hydrogen, alkyl, or aryl; $R_4$ is independently hydrogen, or alkyl; and alternatively, $R_3$ and $R_4$ may be linked together to form a cycloalkyl; wherein all weight percents are based on the total weight of the cured resin system. The epoxy resin may be one or more compounds selected from the group consisting of: cycloaliphatic (acyclic) epoxides, cycloaliphatic epoxides modified with glycols, epoxy phenolic novolac resins, multi-functional (polyepoxy) epoxy resins, bisphenol A-based epoxy resins, and bisphenol F-based epoxy resins.

In one embodiment of the method of the present invention, the epoxy resin comprises a mixture of at least two epoxy resins.

In a particular embodiment of the inventive method, the diamino alcohol compound may be the product of 2-nitropropane and one aldehyde selected from the group consisting of crotonaldehyde and cinnamaldehyde. For example, R, $R_1$, $R_2$, $R_3$ and $R_4$ are each methyl.

DETAILED DESCRIPTION OF THE INVENTION

A new and useful class of amino compound, namely diamino alcohols, has been discovered, along with processes for their manufacture. These compounds are produced by tandem Michael and Henry reaction of nitroalkanes with one or more α,β-unsaturated aldehydes and, optionally, post reacted with an aldehyde such as formaldehyde. They may be represented by the following formula:

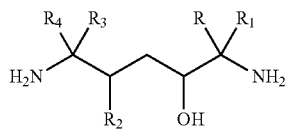

wherein R is independently hydrogen, alkyl, aryl, or —$CH_2OH$; $R_1$ is independently hydrogen, alkyl, or —$CH_2OH$; alternatively, R and $R_1$ may be linked together to form a cycloalkyl; $R_2$ is independently hydrogen, methyl, alkyl, phenyl or substituted phenyl; $R_3$ is independently hydrogen, alkyl, phenyl or substituted phenyl, or —$CH_2OH$; $R_4$ is independently hydrogen, alkyl, or —$CH_2OH$; and alternatively, $R_3$ and $R_4$ may be linked together to form a cycloalkyl.

The foregoing category of diamino alcohols includes various degrees of poly-alcohols ("polyols") as well as simple diamino mono-alcohols. The simpler diamino mono-alcohols would have the following formula:

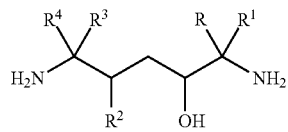

wherein R is independently hydrogen, alkyl, phenyl or substituted phenyl; $R_1$ is independently hydrogen or alkyl; alternatively, R and $R_1$ may be linked together to form a cycloalkyl; $R_2$ is independently hydrogen, alkyl, or phenyl or substituted phenyl; $R_3$ is independently hydrogen, alkyl, or aryl; $R_4$ is independently hydrogen or alkyl; and alternatively, $R_3$ and $R_4$ may be linked together to form a cycloalkyl.

The diamino mono-alcohols of the present invention may be produced by reaction of a nitroalkane and an α,β-unsaturated aldehyde which produces an intermediate dinitro alcohol compound. This reaction is typically operated at temperatures between 0° C. and 100° C. under atmospheric pressure, for example, without limitation between 0° C. and 50° C. Applicants have surprisingly and conveniently found that this reaction proceeds sequentially with Michael addition of nitroalkane to the olefin occurring first, followed by aldol (Henry) reaction in which the second nitroalkane is added to the aldehyde, to produce a single species of dinitro mono-alcohol intermediate.

The nitroalkane may be a primary or secondary nitroalkane having the formula:

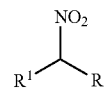

wherein R is hydrogen, $R^1$ is hydrogen, alkyl, phenyl or substituted phenyl; or wherein R is alkyl, phenyl, or substituted phenyl, and $R^1$ is alkyl, or R and $R^1$ may be linked together to form a cycloalkyl. For example, without limitation, nitromethane, nitroethane, 2-nitropropane, nitrocyclohexane etc. are all suitable nitroalkanes for use as starting materials to prepare the diamino alcohol compounds in accordance with the present invention. More particularly, the primary or secondary nitroalkane may be a $C_1$-$C_{20}$ nitroalkane, a $C_1$-$C_{10}$ nitroalkane, or even a $C_2$-$C_6$ nitroalkane.

Suitable α,β-unstaturated aldehydes have the following formula:

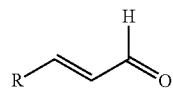

wherein R is hydrogen, methyl(alkyl), phenyl, or substituted phenyl. Suitable unsaturated aldehydes include, but are not limited to, acrolein, crotonaldehyde, cinnamaldehyde, derivatives of cinnamaldehyde substituted at the aromatic ring, etc.

The foregoing sequential Michael-Henry reaction between the nitroalkane and unsaturated aldehyde occurs in the presence of a suitable catalyst including, but not limited to, organic bases such as 1,8-Diazabicyclo[5.4.0]undec-7-ene ("DBU"), 2-dimethylamino-2-methyl-1-propanol ("DMAMP"), trimethylamine (TMA), dimethylisopropylamine (DMIPA), N,N,N',N'-tetramethylguanidine (TMG), Verkade's base, etc. Alternatively, inorganic bases such as potassium carbonate, and sodium hydroxide may also be used as catalysts for the sequential Michael-Henry reaction described above.

The starting materials are provided at a molar ratio of nitroalkane to aldehyde of typically 2:1. The reaction may be performed with or without a solvent, according to the preference of the practitioner. Suitable solvents include but are not limited to tetrahydrofuran, 2-methyltetrahydrofuran, dioxane.

Where the desired product is a diamino poly-alcohol compound, the (1) nitroalkane is a primary nitroalkane and the process for production of the diamino poly-alcohol compound further comprises, after reacting the (1) primary nitroalkane and (2) α,β-unstaturated aldehyde, but prior to reducing the resulting nitro alcohol, further reacting the resulting nitro alcohol with (3) an aldehyde, such as formaldehyde, to form a dinitro poly-alcohol compound, which is then further reduced under hydrogenation conditions and in the presence of a catalyst.

More particularly, the production of diamino poly-alcohol (polyol) compounds proceeds as follows: (A) reacting (1) a primary nitroalkane and (2) an α,β-unsaturated aldehyde to form a dinitroalcohol; (B) further reacting the dinitroalcohol with (3) an aldehyde, such as formaldehyde, to form a dinitro poly-alcohol (e.g., a dintro-dialcohol or dinitro-trialcohol) product; and (C) then further reducing the dinitro poly-alcohol product to the corresponding diamino poly-alcohol product under hydrogenation conditions, in the presence of a catalyst. The reaction is performed under conditions in which the Michael addition of the nitroalkane occurs more rapidly than the Henry reaction (i.e., temperatures between 0° C. and 100° C. under atmospheric pressure, for example, without limitation, between 0° C. and 50° C.), allowing for the sequential reactions to produce the dinitro poly-alcohol. The (1) nitroalkane and the (2) aldehyde are provided at a molar ratio of 2:1 during the first reaction step which produces the dinitro alcohol. The primary nitroalkane may be a primary $C_1$-$C_{20}$ nitroalkane, for example, without limitation, a primary $C_1$-$C_{10}$ nitroalkane. The α,β-unsaturated aldehyde may be selected from the group consisting of: acrolein, crotonaldehyde, cinnamaldehyde, and derivatives of cinnamaldehyde substituted at the aromatic ring.

The subsequent reaction of the dinitro alcohol with a second aldehyde, such as formaldehyde, occurs after the completion of the reaction to form the nitro alcohol has been confirmed (e.g, such as by analytical methods known to persons of ordinary skill in the art including, but not limited to, gas chromatography or high-performance liquid chromatography). The ratio of the formaldehyde to the dinitro alcohol is typically 2:1 for this sequential reaction step. Again, this reaction may be performed with or without a solvent, according to the preference of the practitioner, such as, without limitation, tetrahydrofuran, 2-methyltetrahydrofuran, dioxane.

The intermediate dinitro alcohol compound produced by either of the above-described sequential Michael-Henry reactions has the following formula:

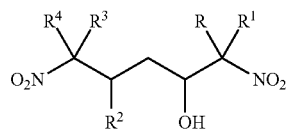

wherein R is independently hydrogen, alkyl, aryl, or —CH$_2$OH; $R_1$ is independently hydrogen, alkyl, or —CH$_2$OH; alternatively, R and $R_1$ may be linked together to form a cycloalkyl; $R_2$ is independently hydrogen, methyl, alkyl, phenyl or substituted phenyl; $R_3$ is independently hydrogen, alkyl, phenyl or substituted phenyl, or —CH$_2$OH; $R_4$ is independently hydrogen, alkyl, or —CH$_2$OH; and alternatively, $R_3$ and $R_4$ may be linked together to form a cycloalkyl.

In a particular embodiment, the nitroalkane is 2-nitropropane and the α,β-unsaturated aldehyde is either crotonaldehyde or cinnamaldehyde, which would produce a dinitro mono-alcohol compound.

The dinitro alcohol intermediate, whether mono- or poly-alcohol, is then further reduced under hydrogenation conditions in the presence of a suitable catalyst to produce the desired diamino alcohol comprising two amino groups, each of which is bonded to a tertiary carbon atom. Suitable dehydrogenation catalysts include, without limitation, Raney nickel, or a platinum- or palladium-based catalyst, (e.g., platinum or palladium in elemental form or as oxides, with or without supports, e.g., carbon). Other suitable reducing agents include, without limitation, metal/acid combinations, e.g., iron/acetic acid; and aluminum hydrides. An example of a dehydrogenation catalyst system suitable for use in accordance with the present invention is hydrogen gas in combination with any of Raney nickel, platinum or palladium.

The hydrogenation of dinitro alcohol to produce the diamino alcohol may be performed at pressures between 100 and 1000 pounds per square inch ("psi") and temperatures between 30° C. and 100° C. A solvent may be used, such as, without limitation, tetrahydrofuran or methanol.

The diamino alcohols of the present invention are useful hardeners for epoxy resin systems, some of which are capable of yielding cured epoxy resins with glass transition temperatures (Tgs) of greater than 120° C. Such curable epoxy resin systems may be formed by admixing at least one epoxy resin, the diamino alcohol described hereinabove, as well as, optionally, a catalyst, other hardeners, toughening agents, flame retardants and other additives known and used by persons of ordinary skill in the relevant art. The curable epoxy resin system may then be cured, for example, without limitation and dependent upon the particular type of epoxy resin used and its intended application, by exposure to elevated temperatures, exposure to ultraviolet light, etc.

The glass transition temperature, or Tg, may be measured by any suitable method known and practiced by persons of ordinary skill in the relevant art, including, but not limited to, differential scanning calorimetry (DSC) or dynamic mechanical thermal analysis (DMTA), as per ASTM D5045.

Measurement of glass transition temperature by DSC may be performed, for example, using a Q100 DSC testing apparatus, commercially available from T.A. Instruments of New Castle, Del., USA, and set up for 10° C./minute scans. Sample size is typically kept under 15 milligrams. Hermetic pans with holes punched in the lids may be used to contain the samples in the DSC cell. DSC scans are analyzed for final Tg using half extrapolated tangents (Tg analysis).

Measurement of glass transition temperature by DMTA may be performed, for example, according to ASTM D5045, at an angular frequency of 1 Hertz (Hz) and 0.1% strain, run on three rectangular samples. The temperature range chosen for these examples may be between 30° C. and 2800° C. The sample size if typically 17 millimeters (mm) long, 13 mm wide and 4 mm thick. The samples are inserted between adjustable clamps and the clamps are closed using a torque wrench. The samples are then subjected to oscillations in torsion mode. Samples are subjected to a dynamic temperature ramp at 3° C./minute. A slower heating rate may be employed to maintain thermal equilibrium and considering the thermal mass of the sample. Storage and loss modulus as well as tangent delta are recorded.

A cured resin system in accordance with the present invention comprises: (a) 35 to 90% by weight of at least one epoxy resin; and (b) 0.1 to 35% by weight of a diamino alcohol compound having the formula:

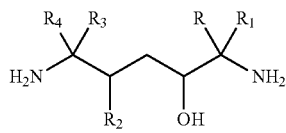

wherein R is independently hydrogen, alkyl, or aryl; $R_1$ is independently hydrogen, or alkyl; alternatively, R and $R_1$ may be linked together to form a cycloalkyl; $R_2$ is independently hydrogen, alkyl, or aryl; $R_3$ is independently hydrogen, alkyl, or aryl; $R_4$ is independently hydrogen, or alkyl; and alternatively, $R_3$ and $R_4$ may be linked together to form a cycloalkyl; wherein all weight percents are based on the total weight of the cured resin system.

As is familiar and well within the ability of persons of ordinary skill in the relevant art, amounts up to the stoichiometric amount of the diamino alcohol hardener, relative to the epoxy resin, are considered "effective amounts" in accordance with the present invention. More particularly, the stoichiometric amount of the diamino alcohol hardener is calculated by adding together the number of equivalents on the basis of weight per displaceable —NH group in the amino alcohol utilized. Generally, as is also understood by persons of ordinary skill, a lesser amount of a diamino alcohol hardener of higher molecular weight will be required than of a diamino alcohol hardener of lower molecular weight. For example, whereas 35% by weight of a diamino alcohol hardener derived from crotonaldehyde might be suitable for producing an epoxy resin system in accordance with the present invention, if a diamino alcohol hardener derived from cinnamaldehyde were used instead, then some amount less than 35% by weight would be appropriate.

The preferred diamino alcohols for use as hardeners in epoxy resin systems are those in which the amine functionality is attached to a tertiary carbon, such as, for example, compounds of the following formulae:

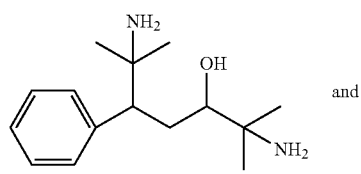

and

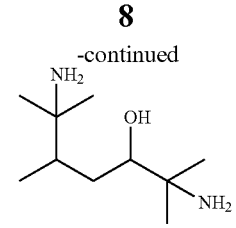

These materials are obtained in two steps, as described in detail hereinabove, by reacting one mole of either cinnamaldehyde or crotonaldehyde with two moles of 2-nitropropane, followed by hydrogenating using Raney nickel catalyst.

The most effective diamino alcohols to provide epoxy resin systems having high Tg's are when $R_2$ is an alkyl chain or phenyl group and when R, $R_1$, $R_3$ and $R_4$ are methyl groups.

The multifunctional diamino alcohols may be used as a hardener system to cure a variety of epoxy resins and ultimately give high Tg materials (Tg greater than 140° C.). The Tg reported for the cured epoxy resin systems incorporating some of these diamino alcohols, particularly the 2-nitropropane adducts, are higher (by at least 20° C.) than epoxys containing conventional amino alcohol hardeners. This is particularly beneficial in high temperature applications. In addition, these materials cure very efficiently and do not have a high density of hydroxyl group, thus attracting less water and this in return give better overall property of the final system.

The diamines functionality provides multiple sites for curing an epoxy resin and, thus, allows reaction of multiple epoxy groups using one mole of the diamino alcohol to produce several new secondary alcohols sites in the epoxy system. This is beneficial as it is widely believed that secondary alcohols assist in adhesion promotion to the metal in an epoxy coating formulation. Without intending to be limited by theory, the alcohol functionality is also believed to have a catalytic effect during the curing process. Similarly, control of the stoichiometry of the epoxy resin to the diamine such that the cured resin maintains a high concentration of secondary amine functionality is also anticipated to enhance the adhesion of this resin to surfaces resulting in a strongly adhered, high Tg resin in applications where these two properties are important.

Again, without intending to be limited by theory, a notable feature of present invention is that the diamino alcohol of the present invention has multiple amines rather than multiple hydroxyl groups, as in the amino compounds more typically used for epoxy systems. This may provide for effective curing of the resin and also allows modification of the backbone of the diamine hardener by changing the alkyl chain length. This technique also allows addition of any desired functional group such as phenyl groups, alkyl groups, hydroxyl groups and any degree of amine (primary, secondary or tertiary) that would be beneficial in controlling the Tg.

Moreover, the above-described method of synthesis used in the preparation of the diamino alcohols allows for the careful placement of desired functionality on the molecule. The synthesis methods allow for creating diamines of high amine functionality in a fairly compact but highly substituted molecule. The Tg value of the cured epoxy resin can be changed by changing the nature of nitro paraffin used to construct the molecules.

The diamino alcohols can be used with any type of epoxy resin, which means, as that term is used herein, compounds containing one or more reactive oxirane groups (—$C_2H_3O$), referred to herein as "epoxy groups" or "epoxy functionality". Suitable epoxy resins include those compounds containing at least one vicinal epoxy group. The epoxy resin may be saturated or unsaturated, aliphatic, cycloaliphatic, aromatic or heterocyclic and may be substituted. The epoxy resin may also be monomeric or polymeric.

More particularly, epoxy resins suitable for use in accordance with the present invention include, for example without limitation, cycloaliphatic (acyclic) epoxides, cycloaliphatic epoxides modified with glycols, epoxy phenolic novolac resins, multifunctional (polyepoxy) epoxy resins, bisphenol A-based epoxy resins, and bisphenol F-based epoxy resins, among others, as well as mixtures thereof.

Cycloaliphatic epoxides include, for instance, diepoxides of cycloaliphatic esters of dicarboxylic acids, such as bis(3,4-epoxycyclohexylmethyl)oxalate, bis(3,4-epoxycyclohexylmethyl)adipate, vinylcyclohexene diepoxide, and dicyclopentadiene diepoxide. Commercially available cycloaliphatic epoxy resins include 3,4-epoxycyclohexylmethyl-3,4-epoxycyclohexane carboxylate and other cycloaliphatic epoxy resins under the tradename designations ERL, D.E.R. and D.E.N., all available from The Dow Chemical Company of Midland, Mich., USA. Also, CELLOXIDE 2021, CELLOXIDE 2021P, EPOLEAD GT301 are cycloaliphatic epoxy resins commercially available from Daicel Chemical Industries, Ltd of Japan. Cycloaliphatic epoxides modified with glycols include, for instance, an aliphatic epoxy modified with polypropylene glycol, epoxidized polybutadiene, silicone resin containing epoxy functionality, epoxy vinylester resins, glycidated resins, epoxidized oils, etc. ERL-4299 (bis(3,4-epoxycyclohexyl) adipate) is commercially available from The Dow Chemical Company and CELLOXIDE 2080 series ((3',4'-epoxycyclohexane)methyl 3',4'-epoxycyclohexyl-carboxylate modified ε-caprolactone) is commercially available from Daicel Chemical Industries, Ltd.

Epoxy phenolic novolac resins suitable for use in the present invention include, without limitation, condensates of phenols with formaldehyde that are obtained under acid conditions, such as phenol novolacs, bisphenol A novolacs and cresol novolacs. Multifunctional epoxy resins include, for example, without limitation, resorcinol diglycidyl ether (1,3-bis-(2,3-epoxypropoxy)benzene), triglycidyl p-aminophenol (4-)2,3-epoxypropoxy)-N,N-bis(2,3-epoxypropyl)aniline), polyepoxy compounds based on aromatic amines and epichlorohydrin, such as N,N'-diglycidylaniline, N-diglycidyl-4-aminophenyl, etc., and mixtures of such compounds.

Other epoxy resins suitable for use in the present invention include, but are not limited to, 4,4'-dihydroxydiphenyl dimethyl methane (i.e., bisphenol A), bis(4-hydroxyphenyl) methane (i.e., bisphenol F), diglycidyl ether of Bisphenol F, and other resins based on bisphenyl A and bisphenyl F. D.E.R. 332, D.E.R. 383 and D.E.R. 331 are bisphenol A-based epoxy resins commercially available from The Dow Chemical Company. D.E.R. 354 and D.E.R. 354LV are bisphenol F-based epoxy resins also commercially available from The Dow Chemical Company.

These materials can be used with other hardeners and/or catalyst systems depending on the application. The material can also be used as a 'modified hardener' or prepolymer by reacting it, initially, with LER (liquid epoxy resin) and then using the reaction product in the final epoxy resin formulation.

Additional hardeners, or curing agents may also be included in the resin system in accordance with the present invention. Suitable amine- and/or amide-curing agents include those compounds that contain a primary amine moiety, and compounds that contain two or more primary or secondary amine or amide moieties linked to a common central organic moiety. Examples of suitable amine-containing curing agents include amino alcohols, ethylene diamine, diethylene triamine, polyoxypropylene diamine, triethylene tetramine, dicyandiamide, melamine, cyclohexylamine, benzylamine, diethylaniline, methylenedianiline, m-phenylenediamine, diaminodiphenylsulfone, 2,4 bis(p-aminobenzyl) aniline, piperidine, N,N-diethyl-1,3-propane diamine, and the like, and soluble adducts of amines and polyepoxides and their salts. Suitable amide-curing agents include the dicyandiamide and polyamidoamines. Polyamidoamines are typically the reaction product of a polyacid and an amine.

Additionally, thiol curing agents may be used with the present invention. As used herein, "thiol" also includes polythiol and polymercaptan curing agents. Suitable thiols include, but are not limited to, aliphatic thiols such as methanedithiol, propanedithiol, cyclohexanedithiol, 2-mercaptoethyl-2,3-dimercaptosuccinate, diethylene glycol bis(2-mercaptoacetate), pentaerythritol tris(thioglycolate), aromatic thiols such as di-, tris-, or tetra-mercaptobenzene, dimercaptobiphenol, toluenedithiol, among others.

Additional accelerators, or catalysts, can be added to the epoxy resin composition. Accelerators include those compounds which catalyze the reaction of the epoxy resin with the curing agent. Accelerators are compounds containing amine, phosphine, heterocyclic nitrogen, ammonium, phosphonium, arsonium or sulfonium moieties. Examples include imidazoles, imidazolidines, and imidazolines. Other catalysts include free radical initiators, such as azo compounds, including azoisobutyronitrile, and organic peroxides, such as tertiary-butyl perbenzoate, tertiary-butyl peroctate, methyl ethyl ketone peroxide, acetoacetic peroxide, and benzoyl peroxide, among others.

The resin system in accordance with the present invention may further comprise flame retardant additives including, without limitation, brominated additives such as tetrabromobisphenol A (TBBA) and derivatives thereof, and non-brominated additives such as compounds derived from DOP (9,10-dihydro-9-oxa-10-phosphaphenanthrene 10-oxide), e.g., DOP-hydroquinone, condensation products of DOP with glycidyl ether, derivatives of novolacs, and inorganic retardants such as aluminum trihydrate and aluminum phosphinite.

The resin system in accordance with the present invention may further comprise toughening agents for reducing brittleness in the cured resin system. Toughening agents include, but are not limited to, rubber compounds, block copolymers (e.g., amphiphillic block copolymers), carboxyl terminated butadiene, polysulfide-based toughening agents, amine-terminated butadiene nitrile and polythioethers. As is well known and understood by persons of ordinary skill in the art, toughening agents may be present in epoxy resin systems in amounts between 0.1 and 30% by weight, based on the total weight of resin system.

Conventional and known additives and fillers may also be included in the resin system of the present invention. Such additives and fillers may include, for example, boric acid, silica, glass, talc, metal powders, wetting agents, pigments, coloring agents, mold release agents, coupling agents, ion scavengers, UV stabilizers, flexibilizing agents and tackifying agents. These may also include other resins such as polyol resins, polyester resins, phenolic resins, as well as other agents such as for viscosity reduction and stabilization, as are well known in the industry.

EXAMPLES

Example 1

Synthesis of 2,5,6-trimethyl-2,6-dinitroheptan-3-ol (Dinitro Alcohol Intermediate)

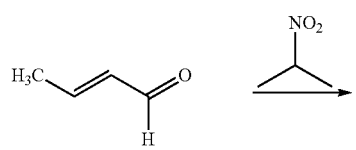

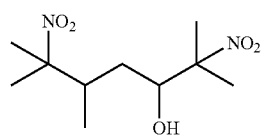

A three neck round bottom flask equipped with a stir bar, thermocouple, dropping funnel capped with nitrogen inlet and condenser was charged with 2-nitropropane ("2-NP") (50 g, 0.56 mols, 5.0 equivalents) and catalytic amount of DBU. The yellow solution was mixed under nitrogen for about thirty minutes. To this mixture was added crotonaldehyde (7.9 g, 9.2 mL, 0.112 moles, 1.0 equivalent) drop-wise over a period of twenty minutes. The addition of crotonaldehyde was done at three different conditions, as follows, and all of them yielded the same results.

Conditions:

A: propwise addition of crotonaldehyde when the 2-NP/DBU mixture is at −30° C. and warm to room temperature.

B: propwise addition of crotonaldehyde when the 2-NP/DBU mixture is at 20° C. and warm to room temperature.

C: propwise addition of crotonaldehyde when the 2-NP/DBU mixture is at room temperature In each case, after complete addition, the reaction was stirred for approximately 5-6 hours at room temperature. During this time, white solid crashed out of the solution. At this point, GC analysis showed the absence of any crotonaldehyde in the reaction mixture. After letting the reaction mixture stir overnight at room temperature and under nitrogen, the white solid was isolated by vacuum filtration and the solid was washed thoroughly with water. The solid was air dried, followed by vacuum drying, at 45° C. The total yield of the desired nitro alcohol was 72% (27.8 g). Nuclear magnetic resonance testing ("NMR") and liquid chromatography (LC) showed that the product was >99% pure. $^1$H NMR (CDCl$_3$): ∂ 0.82-1.56 (m, 18H), 4.02-4.07 (m, 1H). $^{13}$C NMR (CDCl$_3$): ∂ 14.1, 20.7, 22.5, 23.1, 23.6, 33.5, 37.9, 73.1, 91.8 and 92.1 ppm. The reaction was also run with smaller molar ratio of the unsaturated aldeyde to nitroalkane. Similar results were obtained to the example above, when the ratio of unsaturated aldehyde to nitroalkane was 1:2.9.

Synthesis of 2,6-diamino-2,5,6-trimethylheptan-3-ol (Diamino Alcohol)

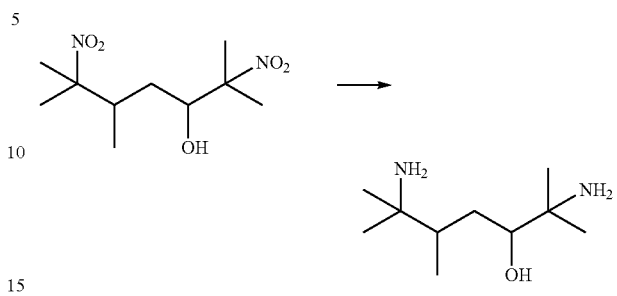

25 g of the nitro alcohol above was dissolved in 200 mL methanol and hydrogenated under in the autoclave at 60° C. using 14.2 g RaNi 3111 as a catalyst and at 600 psi pressure. After workup which included filtration of the catalyst and removal of methanol, approximately 11 g (59% yield) of the low viscous pale green/colorless liquid was obtained. NMR and gas chromatograph-mass spectroscopy ("GC-MS") analysis confirmed the presence of the desired amino alcohol. Chemical ionization mass spectrometry CI-MS showed [M+H]=189 and GC showed that purity of the material to be 94%. The boiling point of the material was approximately 110° C.-120° C. at 0.5-1.5 torr. $^1$H NMR (CDCl$_3$): ∂ 0.48-1.22 (m, 18H), 2.84-2.89 (m, 1H). $^{13}$C NMR (CDCl$_3$): ∂ 16.8, 25.2, 27.9, 30.8, 34.7, 42.2, 51.8, 52.8 and 77.3 ppm. The diamino alcohol product of this Example 1 is labeled "CROT-AMP-NH2" in the Table below.

Example 2

Synthesis of 6-methyl-3,7-dinitrononan-4-ol (Dinitro Alcohol Intermediate)

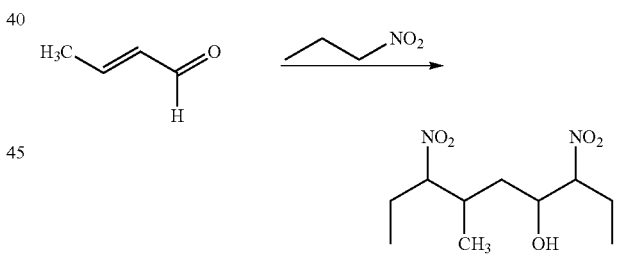

A three neck round bottom flask equipped with a stir bar, thermocouple, dropping funnel capped with nitrogen inlet and condenser was charged with 2-Nitropropane (50 g, 0.56 mols, 5.0 equivalents) and catalytic amount of DBU. The deep yellow solution was mixed under nitrogen for about thirty minutes. To this mixture was added crotonaldehyde (7.9 g, 9.2 mL, 0.112 moles, 1.0 equivalent) drop-wise over a period of twenty minutes. The addition of crotonaldehyde in this case was done at room temperature and during addition, exotherm of about 12° C.-15° C. was observed. After complete addition, the reaction was stirred at room temperature for 6 hours. At this point, GC analysis showed the absence of crotonaldehyde from the mixture. The reaction was let to stir at room temperature overnight and high-performance liquid chromatography (HPLC) analysis showed the presence of only two peaks which correspond to 1-NP which was in excess and the desired product (1CA+2NP adduct). Excess 1-NP was removed by vacuum distillation and the resulting orange viscous liquid was subjected to hydrogenation. This material was about 37.2 g total weight however it still had some 1-NP remaining.

Synthesis of 3,7-diamino-6-methylnonan-4-ol
(Diamino Alcohol Intermediate)

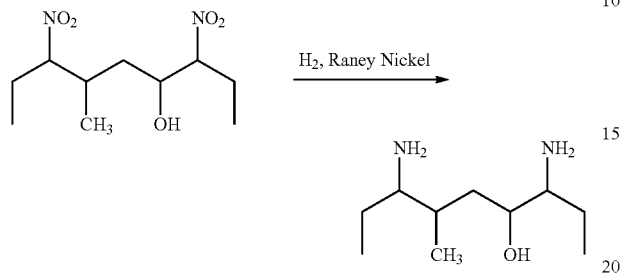

37.2 g of the nitro alcohol above was dissolved in 50 mL methanol and hydrogenated under hydrogen in the autoclave at 60° C., using 14.3 g RaNi 3111 as a catalyst and at 600 psi pressure. After workup which included filtration of the catalyst and removal of methanol, approximately 18 g (64% yield) of the low viscous yellow liquid was obtained. GC-MS analysis confirmed the presence of the desired amino alcohol. CI-MS showed [M+H]=189 and GC showed that purity of the material to be 50%. The rest were low boiling materials.

Example 3

Synthesis of
2,6-dimethyl-2,6-dinitro-5-phenylheptan-3-ol
(Dinitro Alcohol Intermediate)

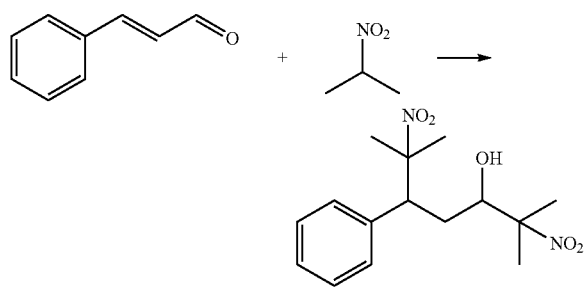

A three neck round bottom flask equipped with a stir bar, thermocouple, dropping funnel capped with nitrogen inlet and condenser was charged with 2-Nitropropane (101.1 g, 1.14 mots, 6.0 equivalents) and catalytic amount of DBU. The yellow solution was mixed under nitrogen for about twenty minutes. To this mixture was added trans-cinnamaldehyde (25.0 g, 0.19 moles, 1.0 equivalent) drop-wise over a period of twenty minutes. During addition of trans-cinnamidehyde to the nitro paraffin, an exotherm of approximately 22° C. was observed. After complete addition, the reaction mixture was heated to 50° C. for 4 h. After the heating time, the mixture was let to cool down slowly to room temperature. When the reaction mixture temperature reached 36.8° C., a pale yellow solid crashed out of the solution. The solid was filtered through a Buchner funnel and washed thoroughly with pentane and ether. The white powder was let to dry under vacuum for 1 hour. The total yield of the desired nitro alcohol was 62% (36 g). NMR showed that the product was >99% pure. $^1$H NMR (CDCl$_3$): ∂ 1.45-2.27 (m, 15H), 3.52-3.54 (m, 1H), 3.67-3.74 (m, 1H), 7.17-7.34 (m, 5H). $^{13}$C NMR (CDCl$_3$): ∂ 20.8, 22.4, 23.2, 25.8, 31.3, 50.3, 72.9, 91.5, 91.6, 128.1, 128.7, 129.4, 136.6 ppm.

Synthesis of
2,6-diamino-2,6-dimethyl-5-phenylheptan-3-ol
(Diamino Alcohol)

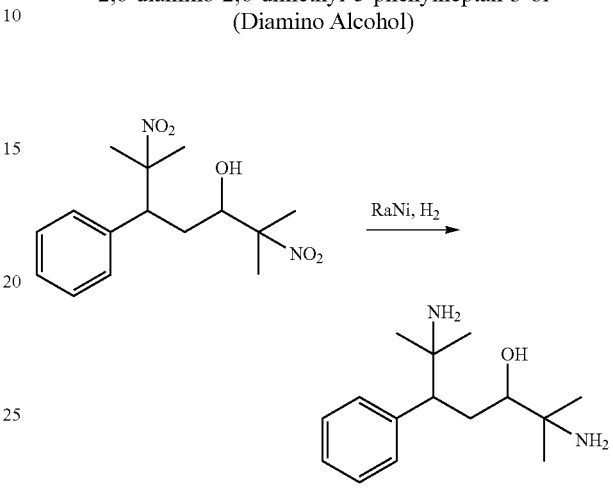

50 g of the nitro alcohol above was dissolved in 300 mL methanol and hydrogenated in the autoclave at 60° C. using 24.3 g RaNi 3111 as a catalyst and at 600 psi pressure. After workup which included filtration of the catalyst and removal of methanol, approximately 40 g (68% yield) of the high viscous pale yellow/colorless liquid was obtained. NMR and GC-MS analysis confirmed the presence of the desired amino alcohol. CI-MS showed [M+H]=251 and GC showed that purity of the material to be 78% straight from the autoclave. The rest of the material seems to be the mono adduct obtained from the reversal of the Henry reaction. The mixture was purified by vacuum distillation and approximately 96.2% purity of the desired material was obtained. The boiling point of the material was approximately 145° C.-155° C. at 0.9-1.1 torr. $^1$H NMR (CDCl$_3$): ∂ 0.91-0.99 (m, 12H), 1.67-1.81 (m, 3H), 2.71-2.76 (m, 2H), 7.08-7.23 (m, 5H). $^{13}$C NMR (CDCl$_3$): ∂ 24.6, 27.9, 28.3, 29.8, 31.6, 51.8, 52.6, 54.2, 75.9, 126.3, 127.8, 129.4, 142.0 ppm.

The diamino alcohol product of this Example 3 is labeled "CINNAM-AMP-NH2" in the Table below.

Example 4

Epoxy Formulation

Below (Table) is the summary of the curing profile and glass transition temperature data. The materials which had the amines on a tertiary carbon had high Tg values. The material with the aromatic ring had the highest Tg of the material screened. This work was carried out using non-isothermal differential scanning calorimetry (DSC).

DSC has been extensively used to study the cure kinetics of such epoxy systems by studying the heat flow to the sample as a function of temperature Dow D.E.R.™ 331 was used as the matrix resin. It is a general purpose resin widely used in the industry and regarded as a good starting point for the preliminary studies. DSC thermograms were obtained for the resin and hardener mixtures. The exothermic behavior can be used as an indication of observing the progress of the reaction. Once the curing reaction is done, the part can be cooled down and another DSC run can be performed to look for the Tg. DSC analyses were performed using a TA instruments Model Q100 Differential Scanning calorimeter. The instrument was connected to a refrigerated cooling system and auto sampler. 10-20 mg uniform viscous mixture premixed was put into high volume (100 μL) stainless steel pans and sealed with a lid. The sample pan was placed in the DSC sample cell at ambient temperature and an empty pan was also placed in the DSC reference cell. Heating was done in a range from room temperature to 250° C. with heating rates of 10° C./min under nitrogen purge gas. Stoichiometric amounts of the curing agents were used and were calculated through the number of active amine hydrogen. Some of the commercial hardeners used with D.E.R. 331 (comparative examples) gave the following Tg values:

D.E.R. 24 (Tg: 129.5° C.); Trimethyl Hexane diamine—TMD (Tg: 104° C.); Aminoethylpiperazine—AEP (Tg: 106° C.); IPD ((Tg: 147° C.); Cyclohexane Bis(methylamine) (Tg: 130° C.); Dytek A ((Tg: 104° C.); Encamine MCA (Tg: 62° C.);

TABLE

| Molecule (Structure) | Tg (° C.) | Exotherm-1 (° C.) | Exotherm-2 (° C.) |
|---|---|---|---|
| Crot-AMP-NH$_2$ | 142 | 118 | 187 |
| Cinnam-AMP-NH$_2$ | 144 | 128 | 207 |
| 1-NP Derivative | 108 | 123 | 175 |
| NM derivative | 78 | 99 | 114 |

What is claimed is:

1. A cured product of a curable resin system, wherein the curable resin system comprises:
   (a) 35 to 90% by weight of at least one epoxy resin; and
   (b) 0.1 to 35% by weight of a diamino alcohol compound having the formula:

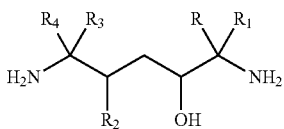

wherein R is independently hydrogen, alkyl, or aryl; $R_1$ is independently hydrogen, or alkyl; alternatively, R and $R_1$ may be linked together to form a cycloalkyl; $R_2$ is independently hydrogen, alkyl, or aryl; $R_3$ is independently hydrogen, alkyl, or aryl; $R_4$ is independently hydrogen, or alkyl; and alternatively, $R_3$ and $R_4$ may be linked together to form a cycloalkyl; wherein all weight percents are based on the total weight of the curable resin system.

2. The cured product according to claim 1, wherein said at least one epoxy resin comprises a mixture of at least two epoxy resins.

3. The cured product according to claim 1, wherein said cured resin system has a glass transition temperature of greater than 120° C.

4. The cured product according to claim 1, wherein said diamino alcohol compound is the reduced product of 2-nitropropane and one aldehyde selected from the group consisting of crotonaldehyde and cinnamaldehyde.

5. The cured product according to claim 1, wherein R, $R_1$, $R_3$ and $R_4$ are each alkyl and $R_2$, is methyl or phenyl, and wherein said cured resin system has a glass transition temperature of greater than 120° C.

6. The cured product according to claim 1, wherein said at least one epoxy resin is one or more compounds selected from the group consisting of: cycloaliphatic (acyclic) epoxides, cycloaliphatic epoxides modified with glycols, epoxy phenolic novolac resins, multifunctional (polyepoxy) epoxy resins, bisphenol A-based epoxy resins, bisphenol F-based epoxy resins, and mixtures thereof.

7. The cured product according to claim 1, further comprising one or more of the following: a catalyst, an additional hardener, a toughener, a flame retardant additive, a filler, and a non-epoxy resin.

8. A method for preparing a curable resin system comprising admixing:
   (a) 35 to 65% by weight of at least one epoxy resin; and
   (b) 0.1 to 35% by weight of a diamino alcohol compound having the formula:

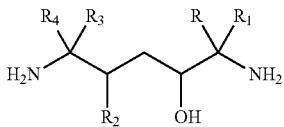

wherein R is independently hydrogen, alkyl, or aryl; $R_1$ is independently hydrogen, or alkyl; alternatively, R and $R_1$ may be linked together to form a cycloalkyl; $R_2$ is independently hydrogen, alkyl, or aryl; $R_3$ is independently hydrogen, alkyl, or aryl; $R_4$ is independently hydrogen, or alkyl; and alternatively, $R_3$ and $R_4$ may be linked together to form a cycloalkyl; wherein all weight percents are based on the total weight of the curable resin system.

9. The method according to claim 8, wherein a cured product of said curable resin system has a glass transition temperature of greater than 120° C.

10. The method according to claim 8, wherein said diamino alcohol compound is the reduced product of 2-nitropropane and one aldehyde selected from the group consisting of crotonaldehyde and cinnamaldehyde.

11. The method according to claim 8, wherein R, $R_1$, $R_3$ and $R_4$ are each alkyl and $R_2$, is methyl or phenyl, and wherein a cured product of said curable resin system has a glass transition temperature of greater than 120° C.

12. The method according to claim 8, wherein said at least one epoxy resin is one or more compounds selected from the group consisting of: cycloaliphatic (acyclic) epoxides, cycloaliphatic epoxides modified with glycols, epoxy phenolic novolac resins, multifunctional (polyepoxy) epoxy resins, bisphenol A-based epoxy resins, bisphenol F-based epoxy resins, and mixtures thereof.

* * * * *